US012741469B2

(12) United States Patent
Nakamura

(10) Patent No.: US 12,741,469 B2
(45) Date of Patent: Sep. 22, 2026

(54) INKJET RECORDING DEVICE

(71) Applicant: KYOCERA Document Solutions Inc., Osaka (JP)

(72) Inventor: Satoru Nakamura, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 126 days.

(21) Appl. No.: 18/849,251

(22) PCT Filed: Mar. 22, 2023

(86) PCT No.: PCT/JP2023/011150
§ 371 (c)(1),
(2) Date: Sep. 20, 2024

(87) PCT Pub. No.: WO2023/189916
PCT Pub. Date: Oct. 5, 2023

(65) Prior Publication Data
US 2025/0196502 A1 Jun. 19, 2025

(30) Foreign Application Priority Data
Mar. 31, 2022 (JP) ................................ 2022-058432

(51) Int. Cl.
*B41J 2/17* (2006.01)
*B41J 2/045* (2006.01)
*B41J 2/165* (2006.01)
*B41J 11/00* (2006.01)

(52) U.S. Cl.
CPC ......... *B41J 2/1742* (2024.05); *B41J 2/04573* (2013.01); *B41J 2/04586* (2013.01); *B41J 2/1652* (2013.01); *B41J 11/007* (2013.01)

(58) Field of Classification Search
CPC ...... B41J 2/1721; B41J 2/1742; B41J 2/1728; B41J 2/17; B41J 2/175; B41J 2/16523; B41J 2/1652; B41J 2/16532; B41J 2/16585; B41J 2/16526; B41J 2/1707; B41J 11/007; B41J 29/38; B41J 2/185;
(Continued)

(56) References Cited

U.S. PATENT DOCUMENTS

2005/0162452 A1 7/2005 Kachi ............................ 347/13
2010/0231676 A1 9/2010 Miyagi ......................... 347/104
2019/0389204 A1 12/2019 Murashima et al.

FOREIGN PATENT DOCUMENTS

JP 2010-167586 A 8/2010
JP 2010-194920 A 9/2010
JP 2019-217691 A 12/2019

OTHER PUBLICATIONS

Extended European Search Report dated Apr. 1, 2026, issued by the European Patent Office in corresponding application EP 23779928.3.

*Primary Examiner* — Jannelle M Lebron
(74) *Attorney, Agent, or Firm* — Stein IP, LLC

(57) ABSTRACT

An inkjet recording device (100) comprises a recording head (40) for recording an image on a recording medium(S) that is being transported, a control unit (6) for controlling flushing processing for discharging ink at a timing different from the timing of the image recording, and a storage unit (7) for storing flushing ink discharged during execution of the flushing processing, wherein the storage unit (7) is detachably fitted to a fitting region (7A), which is a region opposing the recording head (40) across a transport pathway of the recording medium(S).

7 Claims, 8 Drawing Sheets

(58) Field of Classification Search
CPC ............ B41J 2002/1856; B41J 2/04586; B41J 2002/16591; B41J 2/16517
See application file for complete search history.

INKJET RECORDING DEVICE

CROSS-REFERENCE TO RELATED APPLICATIONS

This application is a National Stage of International Application No. PCT/JP2023/011150, filed Mar. 22, 2023, which claims the benefit of Japanese Application No. 2022-058432, filed Mar. 31, 2022, in the Japanese Patent Office, the disclosures of which are incorporated herein by reference.

TECHNICAL FIELD

The present invention relates to an inkjet recording device.

BACKGROUND ART

Conventionally, there has been known an inkjet recording device equipped with a recording head (see, e.g., Patent Document 1). The recording head ejects ink. Then, the ink is deposited on a recording medium, so that an image is recorded on the recording medium.

CITATION LIST

Patent Literature

Patent Document 1: JP 2019-217691 A

SUMMARY OF INVENTION

Technical Problem

With conventional inkjet recording devices, in view of suppressing clogging of nozzles, a flushing process is executed. For collection of ink ejected by the flushing process (this ink is other than ink contributing to image recording), use of a tube, when involved, necessitates making the tube properly laid down around. In other words, spaces for laying out the tube are needed. Also, a pump or other like equipment is needed. As a result of this, the inkjet recording device becomes complicated in configuration.

The present invention having been accomplished to solve this and other objects, an object of the invention is to provide an inkjet recording device capable of collecting ink non-contributing to image recording while suppressing complication of device configuration.

Solution to Problem

In order to achieve the above object, an inkjet recording device according to one aspect of the present invention comprises: a recording head which has nozzles for ejecting ink and which ejects ink to a recording medium under conveyance to record an image on the recording medium; a controller which controls a flushing process of ejecting ink through the nozzles at a timing different from a recording timing of the image onto the recording medium; and a storage part for storing flushing ink ejected through the nozzles during execution of the flushing process. The storage part is removably fitted to a fitting region opposed to the recording head with a conveyance path of the recording medium interposed therebetween.

Advantageous Effects of Invention

With the configuration of the invention, there can be provided an inkjet recording device capable of collecting ink non-contributing to image recording while suppressing any structural complication.

DESCRIPTION OF EMBODIMENTS

Hereinafter, an inkjet recording device according to one embodiment of the present invention will be described by taking, as an example, a printer for recording (printing) images on a recording medium. The recording medium is mostly paper sheets. Various sheets such as OHP sheets may also be used as the recording medium.

<Configuration of Printer>

Figure 1:
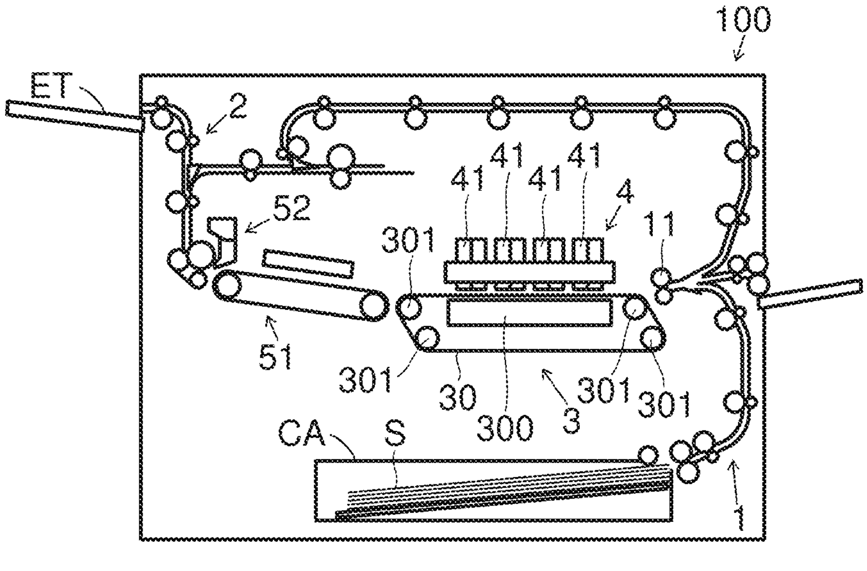
FIG. 1 is a schematic diagram of an inkjet recording device according to one embodiment of the present invention.

As shown in FIG. 1, a printer 100 (corresponding to "inkjet recording device") of this embodiment includes a first conveyance part 1 and a second conveyance part 2. The first conveyance part 1 feeds out a paper sheet S set in a sheet feed cassette CA and conveys the sheet toward a recording position. In a print job by the printer 100, image recording (printing) is performed on the sheet S passing through the recording position. The second conveyance part 2 conveys the sheet that is over recording. The second conveyance part 2 discharges the recorded sheet to a discharge tray ET.

The first conveyance part 1 is equipped with a plurality of conveyance roller members including a registration roller pair 11. In FIG. 1, only the registration roller pair 11 out of the plurality of conveyance roller members is denoted by reference sign. The plurality of conveyance roller members are each rotated to convey the sheet S. The registration roller pair 11 includes a pair of rollers set in pressure contact with each other. A registration nip is formed between the pair of rollers. The sheet S fed from the sheet feed cassette CA enters the registration nip. The registration roller pair 11 is rotated to convey the sheet S having entered the registration nip toward a later-described belt conveyance part 3.

At a time when a forward end of the sheet S has reached the registration nip, the registration roller pair 11 has stopped from rotation. Meanwhile, the conveyance roller members placed upstream of the registration roller pair 11 in a sheet conveyance direction are under rotation. As a result, any skew of the sheet S is corrected.

The printer 100 includes the belt conveyance part 3. The belt conveyance part 3, accepting the sheet S from the first conveyance part 1, conveys the sheet S. The belt conveyance part 3 includes a conveyor belt 30. The conveyor belt 30 is endless shaped and held rotatable. Also, the belt conveyance part 3 includes a plurality of stretching rollers 301. The plurality of stretching rollers 301 are held rotatable. The conveyor belt 30, stretched over the plurality of stretching rollers 301, are rotated. The sheet S conveyed up from the first conveyance part 1 reaches an outer circumferential surface of the conveyor belt 30.

One of the plurality of stretching rollers 301 is coupled to a belt motor (not shown) so as to be rotated with driving force of the belt motor transmitted thereto. Rotation of the stretching roller 301 coupled to the belt motor causes the conveyor belt 30 to be rotated, with the other stretched rollers 301 driven into rotation.

Also, the belt conveyance part 3 includes a suction unit 300. The suction unit 300 is placed inside the conveyor belt 30. The suction unit 300 sucks up the sheet S on the outer circumferential surface of the conveyor belt 30.

More specifically, the conveyor belt 30 has a plurality of suction holes (not shown). The suction holes of the conveyor belt 30 extend through the conveyor belt 30 in its thickness-wise direction. The suction unit 300 sucks up the sheet S via the suction holes of the conveyor belt 30. The sheet S conveyed onto the outer circumferential surface of the conveyor belt 30 is sucked up to the outer circumferential surface of the conveyor belt 30. The conveyor belt 30 is turned around with the sheet S sucked up to the outer circumferential surface. As a result of this, the sheet S is conveyed. That is, the conveyor belt 30 is conveyed with the sheet S carried on the outer circumferential surface.

The printer 100 includes a recording part 4. The recording part 4 is placed opposite to the outer circumferential surface of the conveyor belt 30. When the sheet S is sucked and held on the outer circumferential surface of the conveyor belt 30, the sheet S and the recording part 4 are opposed to each other with a clearance therebetween. As a result of this, the sheet S under conveyance passes through between nozzle surfaces of later-described recording heads 40 and the outer circumferential surface of the conveyor belt 30. That is, clearances between the nozzle surfaces of the recording heads 40 and the outer circumferential surface of the conveyor belt 30 serve at least as part of the conveyance path of the sheet S.

Figure 2:
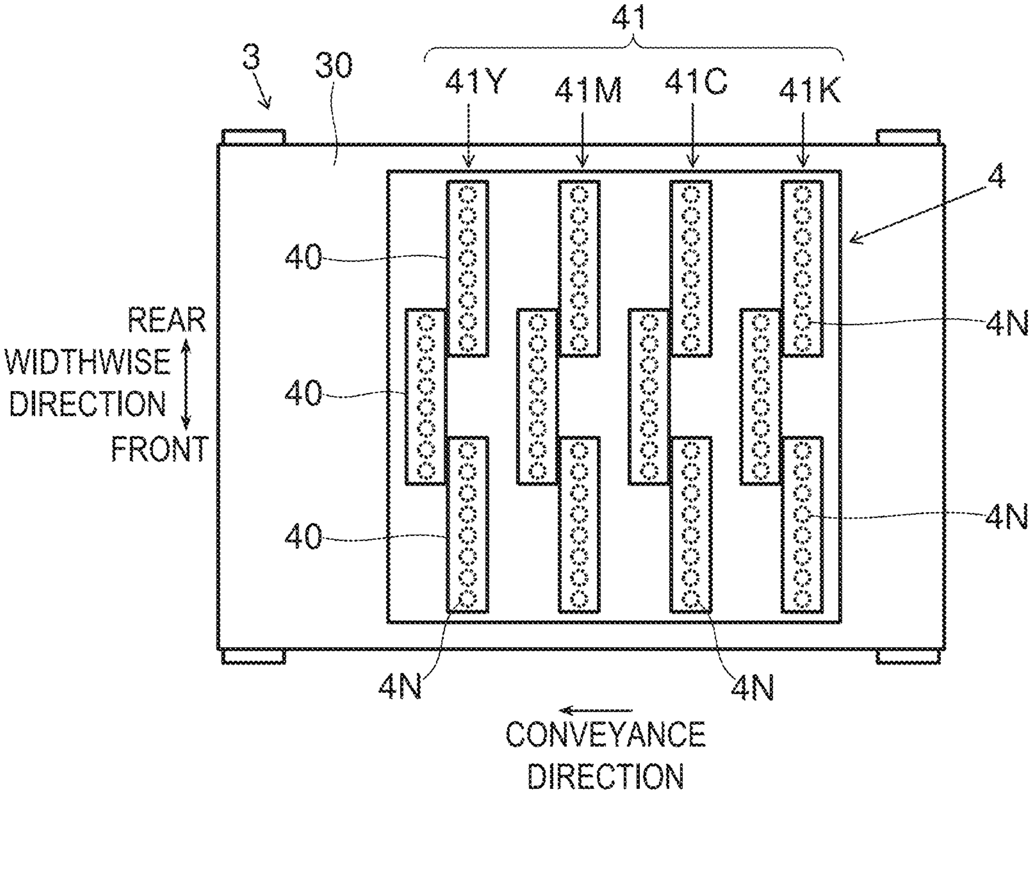
FIG. 2 is a plan view of a recording part in the inkjet recording device according to the embodiment of the invention.

The recording part 4, as shown in FIG. 2, includes four line heads 41 corresponding to individual colors of cyan, magenta, yellow and black, respectively. In FIG. 2, reference sign 'C' is added to the line head 41 of cyan, 'M' is added to the line head 41 of magenta, 'Y' is added to the line head 41 of yellow, and 'K' is added to the line head 41 of black, for their identification. This is also the case for FIG. 5, which will be referenced in later description.

The line head 41 for each color includes a plurality (e.g., three) of recording heads 40. For example, a plurality of recording heads 40 for each color are arrayed in a staggered pattern in a direction perpendicular to the conveyance direction of the sheet S on the conveyor belt 30. Hereinafter, a direction perpendicular to the sheet S conveyance direction on the conveyor belt 30 will be referred to simply as widthwise direction.

The recording heads 40 are placed with clearances formed vertically to the outer circumferential surface of the conveyor belt 30. In other words, the recording heads 40 are placed at such positions as to be vertically opposed to the sheet S that is conveyed by the conveyor belt 30. It is noted that the vertical direction is a direction perpendicular to the conveyance direction and widthwise direction of the sheet S.

Each recording head 40 has, as a nozzle surface, a surface opposed to the conveyor belt 30 (the sheet S on the conveyor belt 30). The nozzle surface of each recording head 40 has a plurality of nozzles 4N. The plurality of nozzles 4N of each recording head 40 allow ink of a corresponding color to be ejected. For example, each recording head 40 has an equal number of the nozzles 4N. The plurality of nozzles 4N of each recording head 40 are arrayed along the widthwise direction of the conveyor belt 30. In FIG. 2, the nozzles 4N are depicted by broken line. Actually, more than depicted nozzles 4N are provided in each recording head 40. For convenience, reference signs are added only to part of the nozzles 4N.

Based on image data to be recorded on the sheet S by the print job, each recording head 40 ejects ink from the nozzles 4N toward the sheet S under conveyance (sheet S on the conveyor belt 30). The ink ejected from the recording heads 40 is deposited onto the sheet S. As a result, an image is recorded on the sheet S. In other words, the recording position is defined between one recording head 40 and another recording head 40. In yet other words, the recording position is defined by positions vertically opposed to the nozzle surface (nozzles 4N) of each recording head 40.

In this connection, ink viscosity remaining at nozzles 4N of less ink ejections out of the plurality of nozzles 4N becomes higher on time base. As a result, clogging occurs, and image quality deteriorates. In order to suppress such disadvantages, the recording heads 40 are subjected to a flushing process. In the flushing process by the recording heads 40, ink remaining at the nozzles 4N is ejected. As a result of this, clogging is suppressed. The flushing process will be described later in more detail.

Reverting to FIG. 1, the printer 100 includes a drying unit 51 and a decurler 52. The drying unit 51, while conveying the sheet S toward the decurler 52, dries ink deposited on the sheet S under conveyance. The decurler 52 corrects curls of the sheet S. The decurler 52 conveys the sheet S after curl correction toward the second conveyance part 2.

Figure 3:
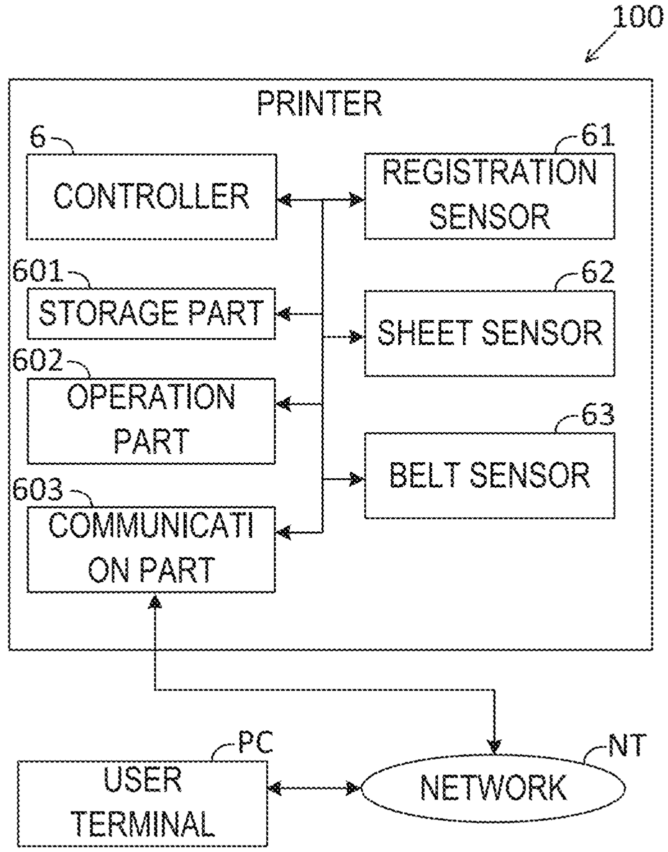
FIG. 3 is a block diagram of the inkjet recording device according to the embodiment of the invention.

Also, as shown in FIG. 3, the printer 100 includes a controller 6. The controller 6 includes a CPU and ASIC or other processing circuits. The controller 6 controls print jobs. In other words, the controller 6 controls operations of the first conveyance part 1, the second conveyance part 2, the belt conveyance part 3, the recording part 4, the drying unit 51, and the decurler 52. In yet other words, the controller 6 controls conveyance of the sheet S and ink ejection of the recording heads 40. Also, the controller 6 controls a flushing process by the recording heads 40.

Connected to the controller 6 are a registration sensor 61, a sheet sensor 62, and a belt sensor 63. Based on outputs from the registration sensor 61, the sheet sensor 62, and the belt sensor 63, the controller 6 controls conveyance of the sheet S and image recording onto the sheet S.

The registration sensor 61 assumes a detection position given by a position which is upstream of the registration nip in the sheet conveyance direction. The registration sensor 61 is, for example, a reflection- or transmission-type optical sensor. The registration sensor 61 varies its output value depending on presence or absence of the sheet S at a pertinent detection position.

Based on an output value of the registration sensor 61, the controller 6 detects a fore-end arrival and a rear-end passage of the sheet S at the detection position of the registration sensor 61. In other words, based on an output value of the registration sensor 61, the controller 6 detects a fore-end arrival and a rear-end passage of the sheet S at the registration nip. Based on an elapsed time since a detection of a fore-end arrival and a rear-end passage of the sheet S at the detection position of the registration sensor 61, the controller 6 measures a conveyance start timing of the sheet S by the registration roller pair 11 (rotation start timing of the registration roller pair 11). Even when the sheet S is skewed, conveyance of the sheet S by the registration roller pair 11 is started under a condition that the skew has been corrected.

The sheet sensor 62 assumes a detection position given by a position between the registration nip and the recording part of the line head 41 located on the most upstream side in the sheet conveyance direction out of the plurality of line heads 41. The sheet sensor 62 varies its output value depending on the presence or absence of the sheet S at a pertinent detection position. The sheet sensor 62 may be a CIS (Contact Image Sensor) or a reflection- or transmission-type optical sensor. For example, a CIS is used as the sheet sensor 62.

Based on an output value of the sheet sensor 62, the controller 6 detects a fore-end arrival and a rear-end passage of the sheet S at the detection position of the sheet sensor 62. Based on an output value of the sheet sensor 62, the controller 6 measures an ejection timing of ink onto the sheet S that is being conveyed by the conveyor belt 30. In addition, based on an elapsed time since a conveyance start of the sheet S by the registration roller pair 11, the controller may also measure an ejection timing of ink onto the sheet S that is being conveyed by the conveyor belt 30.

Also, the controller 6 further measures a sheet-passing time since a fore-end arrival of the sheet S at the detection position of the sheet sensor 62 until a rear-end passage of the sheet S through the detection position of the sheet sensor 62. The sheet-passing time at the detection position of the sheet sensor 62 varies depending on size of the sheet S in the sheet conveyance direction. Therefore, based on the sheet-passing time, the controller 6 recognizes a conveyance-direction size of the sheet S conveyed by the conveyor belt 30. As a result of this, even when the sheet S conveyed by the conveyor belt 30 is of indefinite size, the controller 6 is allowed to recognize the conveyance-direction size of the sheet S.

The belt sensor 63 is a sensor for detecting a predetermined reference position (home position) of the conveyor belt 30. For example, the reference position of the conveyor belt 30 is denoted by a specified mark. As a result, based on an output value of the belt sensor 63, the belt sensor 63 is allowed to detect the reference position of the conveyor belt 30. The belt sensor 63 may be a CIS. Also, the belt sensor 63 may be a transmission- or reflection-type optical sensor.

Based on an oven of the belt sensor 63, the controller 6 detects a reference position of the conveyor belt 30. In other words, based on an output value of the belt sensor 63, the controller 6 detects a rotational position of later-described flushing regions 31 (openings 30*a*).

Also, the printer 100 includes a storage part 601. The storage part 601 includes ROM, RAM and other storage devices. The storage part 601 is connected to the controller 6. The controller 6 reads information from the storage part 601. Also, the controller 6 writes information into the storage part 601.

The printer 100 includes an operation part 602. The operation part 602 includes a touch screen, as an example. The touch screen performs display of software buttons, messages and the like to accept touch operations from a user. Also provided in the operation part are hardware buttons for accepting settings, instructions and the like. The operation part 602 is connected to the controller 6. The controller 6 controls display operations of the operation part 602 (touch screen). The controller 6 also detects operations exerted on the operation part 602.

The printer 100 includes a communication part 603. The communication part 603 includes a communication circuit and the like. The communication part 603 is connected to a user terminal PC via a network NT. The user terminal PC is an information processing device such as a personal computer. The controller 6 uses the communication part 603 to communicate with the user terminal PC. For example, print data (PDL data etc.) including image data to be recorded on the sheet S in a print job are transmitted from the user terminal PC to the printer 100. In other words, an execution request for the print job is transmitted from the user terminal PC to the printer 100. Print data of the print job include various setting data related to printing such as size of the sheet S to be used for the print job.

<Outline of Flushing Process>

Figure 4:
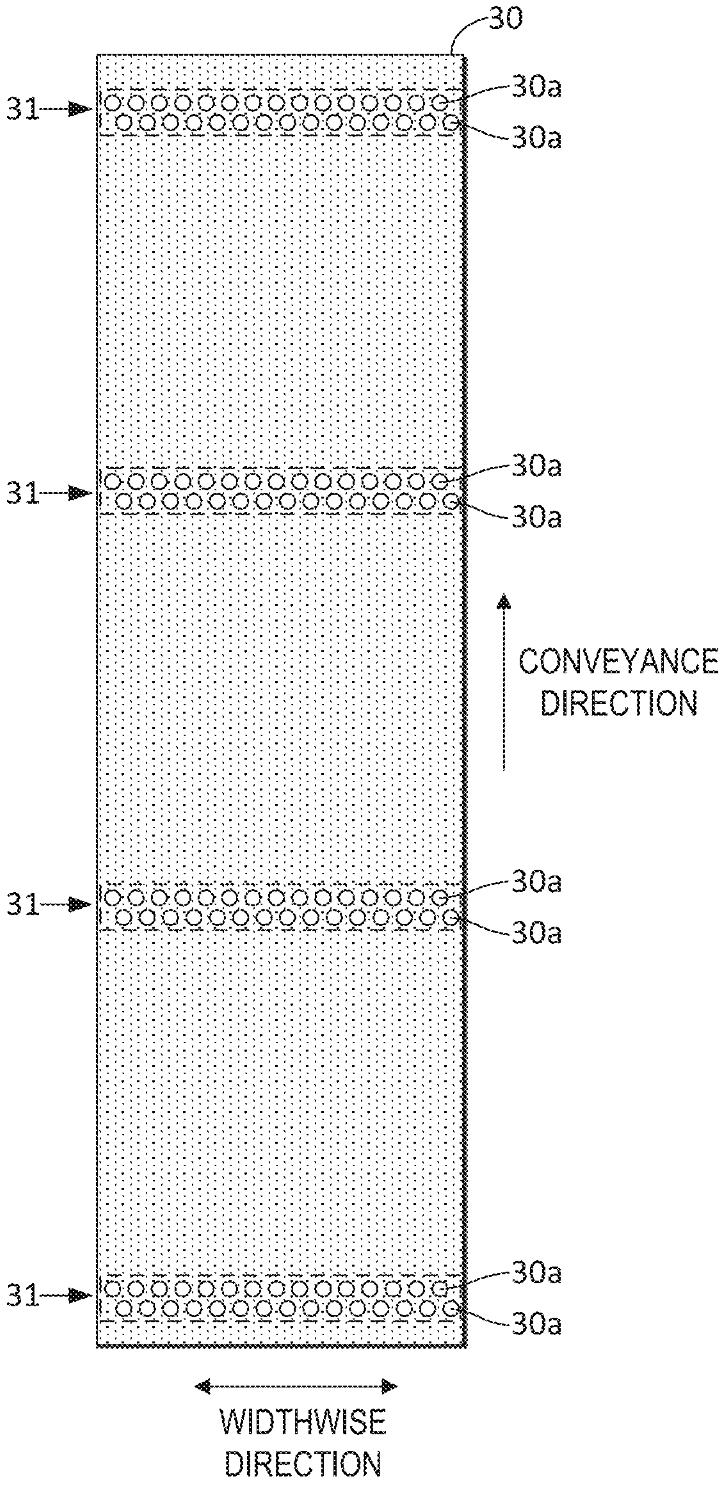
FIG. 4 is a plan view of a conveyor belt in the inkjet recording device according to the embodiment of the invention.

As shown in FIG. 4, the conveyor belt 30 has flushing regions 31. In FIG. 4, the flushing regions 31 are surrounded by broken line. Each flushing region 31 is a region including openings 30*a* extending through in the thicknesswise direction of the conveyor belt 30. The conveyor belt 30 is provided with a plurality of flushing regions 31. The plurality of flushing regions 31 are disposed with specified intervals to each other in a rotational direction of the conveyor belt 30 (conveyance direction of sheet S).

Each flushing region 31 includes a plurality of openings 30*a*. The openings 30*a* are not particularly limited in shape (shape as viewed in the thicknesswise direction of the conveyor belt 30). Each opening 30*a* may be circular, elliptical, oval, or rectangular shaped. By the conveyor belt 30 being rotated, each of the plurality of nozzles 4N comes to be vertically opposed to at least any one of the openings 30*a*.

As the flushing process, a process of ejecting ink from the nozzles 4N of the individual recording heads 40 is executed. During execution of the flushing process, ink is ejected from the nozzles 4N, respectively, at a timing when the nozzles 4N are vertically opposed to the openings 30*a*. Then, ink passes through the openings 30*a*. As a result of this, even when the flushing process is executed, the conveyor belt 30 is prevented from ink deposition. Hereinafter, ink ejected from the individual nozzles 4N during execution of the flushing process will be referred to as flushing ink, being distinguished from ink contributing to image recording on the sheet S. Ink non-contributing to image recording on the sheet S is flushing ink.

During execution of the print job, the controller 6 controls the flushing process. More specifically, the controller 6 measures a conveyance-start timing of the sheet S from the registration roller pair 11 toward the conveyor belt 30 in such fashion that a flushing region 31 appears at a constant period between a rear end of one sheet S and a fore end of another succeeding sheet S). Then, the controller 6 ejects ink from the individual nozzles 4N at a timing when the nozzles 4N are vertically opposed to the openings 30*a* non-overlapping with the sheet S. In other words, the controller 6 forces ink to be ejected from the individual nozzles 4N at a timing different from a recording timing of an image on the sheet S.

<Storage of Flushing Ink>

Figure 5:
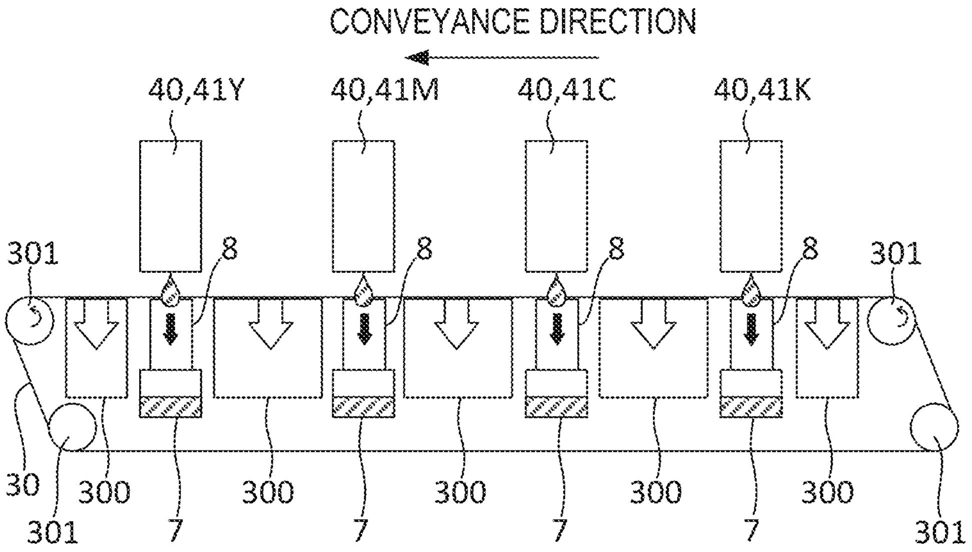
FIG. 5 is a schematic view of around the conveyor belt in the inkjet recording device according to the embodiment of the invention.
Figure 6:
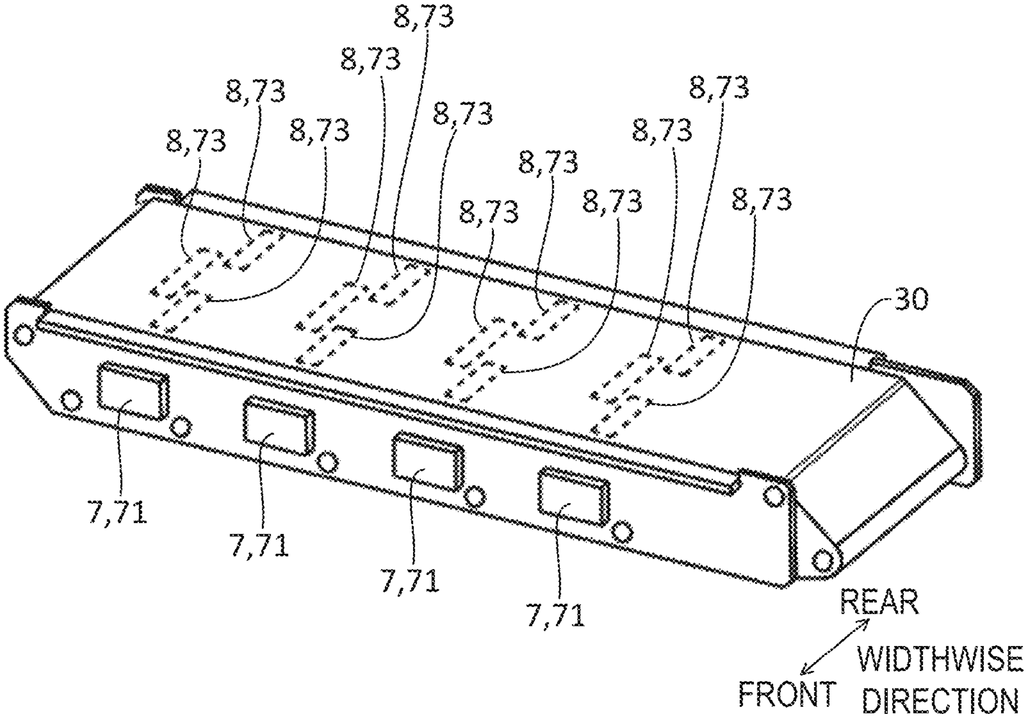
FIG. 6 is a schematic perspective view of around the conveyor belt (a view showing a state in which a casing member has been fitted) in the inkjet recording device according to the embodiment of the invention.
Figure 7:
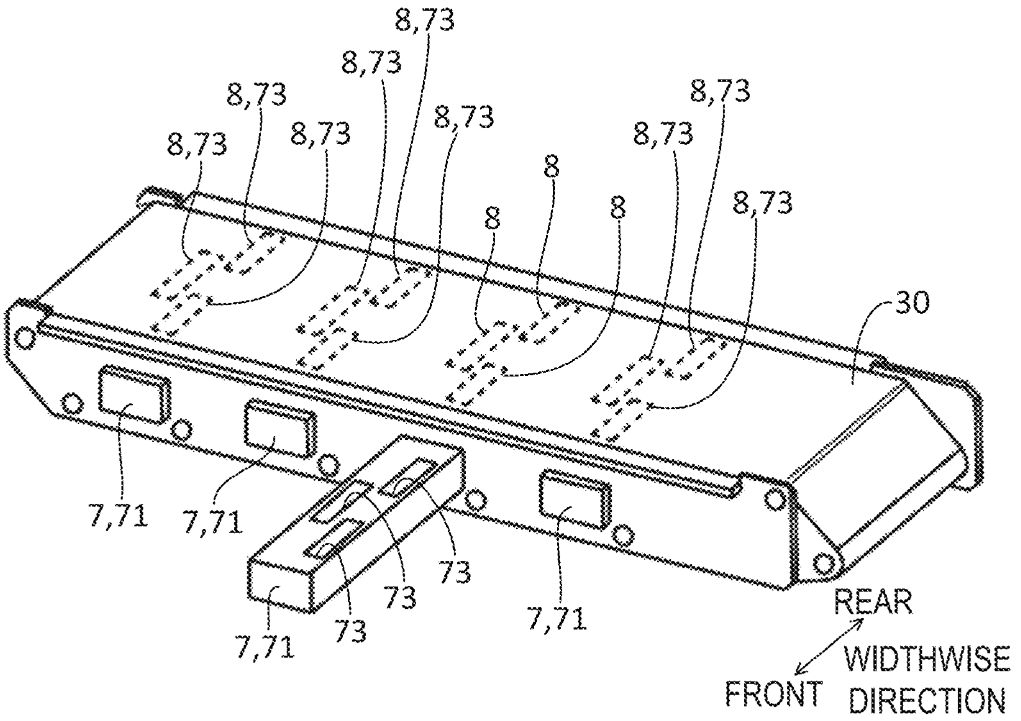
FIG. 7 is a schematic perspective view of around the conveyor belt in the inkjet recording device according to the embodiment of the invention (a view showing a state in which a casing member has been removed)

As shown in FIGS. 5 to 8, the printer 100 includes a storage part 7. In the flushing process, flushing ink passes through the openings 30*a* of the conveyor belt 30, leading to the storage part 7. The storage part 7 stores flushing ink. In FIG. 5, a suctional direction of the flushing ink is denoted by blackened arrow. A suctional direction by suction units 300 is denoted by hollow arrow.

A fitting region 7A of the storage part 7 is positioned inside the conveyor belt 30. In other words, the fitting region 7A is positioned under the recording part 4. In yet other words, the fitting region 7A is a region vertically opposed to the nozzle surfaces of the recording heads 40 with the conveyance path of the sheet S interposed therebetween.

When the storage part 7 is fitted to the fitting region 7A (see FIG. 8), the resulting state is that the storage part 7 is placed inside the conveyor belt 30 (under the recording part 4). That is, the storage part 7 is vertically opposed to the nozzle surfaces of the recording heads 40 with the conveyance path of the sheet S interposed therebetween. As a result, during execution of the flushing process, when flushing ink is ejected from the nozzles 4N, the flushing ink passes through the openings 30*a* so as to be stored in the storage part 7.

Placement of the storage part 7 just under the individual recording parts 4 makes it possible to introduce flushing ink derived from the recording heads 40 to the storage part 7 even without using tubes or other piping members. That is, piping members serving as flow passages for flushing ink are unnecessary for the printer 100. Therefore, tubes or other piping members for collection of the flushing ink are not provided in the printer 100. This is because even with no piping members provided, collection of the flushing ink can be fulfilled. No necessity for piping members entails no necessity for a pump for ejecting (sucking) flushing ink.

In this connection, the storage part 7 is fittable to and removable from the fitting region 7A. For example, the belt conveyance part 3 conveys the sheet S from right to left as viewed from the front (forward in the widthwise direction) of the printer 100. That is, the conveyor belt 30 is annular-shaped as viewed from the front of the device. As a result, the storage part 7 is placed inside the conveyor belt 30 as viewed from the device front.

With this configuration, while a user is in front of the device, pulling out the storage part 7 toward the user (forward in the widthwise direction) allows the storage part 7 to be removed from the printer 100. For example, flushing ink of the storage part 7 is discarded. When flushing ink is discarded, the user removes the storage part 7 from the printer 100.

The storage part 7 is provided in plurality. More specifically, the storage part 7 is provided one for each line head 41. In other words, the printer 100 includes four storage parts 7 corresponding to the individual colors of cyan, magenta, yellow and black, respectively. The four storage parts 7 are arrayed in the conveyance direction of the sheet S on the conveyor belt 30. The four storage parts 7 are placed under their corresponding recording heads 40, respectively, to store ink to be ejected from their corresponding recording heads 40, respectively. In addition, the four storage parts 7 are removably fitted to the fitting regions 7A, individually.

In this embodiment, as described above, since the fitting regions 7A to which the storage parts 7 are fitted, respectively, are provided just under the nozzle surfaces of the recording heads 40 (in regions vertically opposed to the nozzle surfaces of the recording heads 40 with the conveyance path of the sheet S interposed therebetween), it becomes practicable to collect flushing ink without pulling out tubes or other piping members. As a result, neither piping members nor pumps and the like are necessitated. Consequently, ink non-contributing to image recording (i.e., flushing ink) can be collected while suppressing complication of the configuration.

Also, since the four storage parts 7 are fitting and removable individually, a discarding process of flushing ink can be executed in divided plural times. As a result, a possibility that burdens of discarding work become considerable due to heavier weight of discarded matters can be suppressed. Furthermore, discarding of flushing ink can be carried out in units of color-basis divisions.

<Configuration of Storage Part>

The storage part 7 has a casing member 71. The casing member 71 is a container for storing flushing ink. The casing member 71 has in its interior a storage region for flushing ink. More specifically, the casing member 71 includes a top face portion 711 and a bottom portion 712 vertically opposed to each other with the storage region interposed therebetween. The top face portion 711 and the bottom portion 712 are plate-shaped and, as viewed vertically, rectangular-shaped. Also, the casing member 71 has a side wall portion 713 erected upward from an outer edge portion of the bottom portion 712. The top face portion 711 is fixed to an upper end portion of the side wall portion 713, by which the casing member 71 having a storage region for flushing ink in its interior is formed.

For example, the top face portion 711 is removably fitted to an upper end portion of the side wall portion 713. In other words, the top face portion 711 can be removed for the discarding process of the flushing ink. For this reason, the user is allowed to easily discard flushing ink of the casing member 71.

In addition, the top face portion 711 may also be provided as pivotable on a fulcrum given by an upper end portion of the side wall portion 713. That is, the top face portion 711 may also be provided as openable/closable in such directions as to open and close the storage region inside the casing member 71.

Also, the storage part 7 includes a water-absorbing member 72. The water-absorbing member 72 is placed inside (storage region) the casing member 71. The water-absorbing member 72 absorbs flushing ink. The water-absorbing member 72 is, for example, sponge. It is noted that sponge serving as the water-absorbing member 72 is rectangular-parallelepiped shaped, as an example. Constituent material and shape of the water-absorbing member 72 are not particularly limited.

By placement of the water-absorbing member 72 inside the casing member 71, flushing ink is absorbed by the water-absorbing member 72. As a result, scattering of flushing ink can be suppressed. Consequently, flushing ink is deposited on the sheet S and the conveyor belt 30, so that staining of the sheet S and the conveyor belt 30 can be suppressed.

In this connection, the printer 100 includes ducts 8. The ducts 8 are assigned to the storage parts 7, respectively. The ducts 8 are assigned to the recording heads 40 in one-to-one correspondence. Each duct 8 extends from its corresponding recording head 40 side toward the storage part 7 side. Then, each duct 8 is connected to the casing member 71 of the corresponding storage part 7. In addition, the ducts 8 are identical in connection structure to one another. Accordingly, hereinafter, the connection structure of one duct 8 will be concentratedly treated and explained, while that of the other ducts 8 will be omitted in description.

The casing member 71 has a connection opening 73 in the top face portion 711. The connection opening 73 is a rectangular opening vertically (in the thicknesswise direction) extending through the top face portion 711. Then, the duct 8 is connected to the connection opening 73. In other words, a passage of the duct 8 is communicated with the storage region of the casing member 71 via the connection opening 73.

The duct 8 is a hollow rectangular-cylindrical shape linearly extending in the vertical direction (direction directed from the recording head 40 side toward the storage part 7 side). In other words, the passage of the duct 8 extends linearly with a constant width from the recording head 40 side toward the storage part 7 side. In yet other words, the passage of the duct 8 extends flatly without any step gap from the recording head 40 side toward the storage part 7 side. Therefore, no plane facing the vertical direction is present inside the duct 8.

In addition, three recording heads 40 are assigned to each color. That is, three ducts 8 are assigned to each color. Three ducts 8 of each color are connected to one casing member 71 corresponding thereto. That is, each casing member 71 has three connection openings 73 at its top face portion 711.

Connecting the duct 8 to the casing member 71 makes it possible to guide mist-like flushing ink efficiently to the casing member 71. As a result of this, scattering of flushing ink and resultant staining of the sheet S and the conveyor belt 30 can be suppressed to more extent. Also, the passage of the duct 8, which extends linearly with a constant width, contributes to suppressing deposition of flushing ink inside the duct 8. No deposition of flushing ink inside the duct 8 contributes to suppressing upward projection of flushing ink or other deposits upward of the duct 8, so that staining of the sheet S and the conveyor belt 30 can be suppressed.

Figure 8:
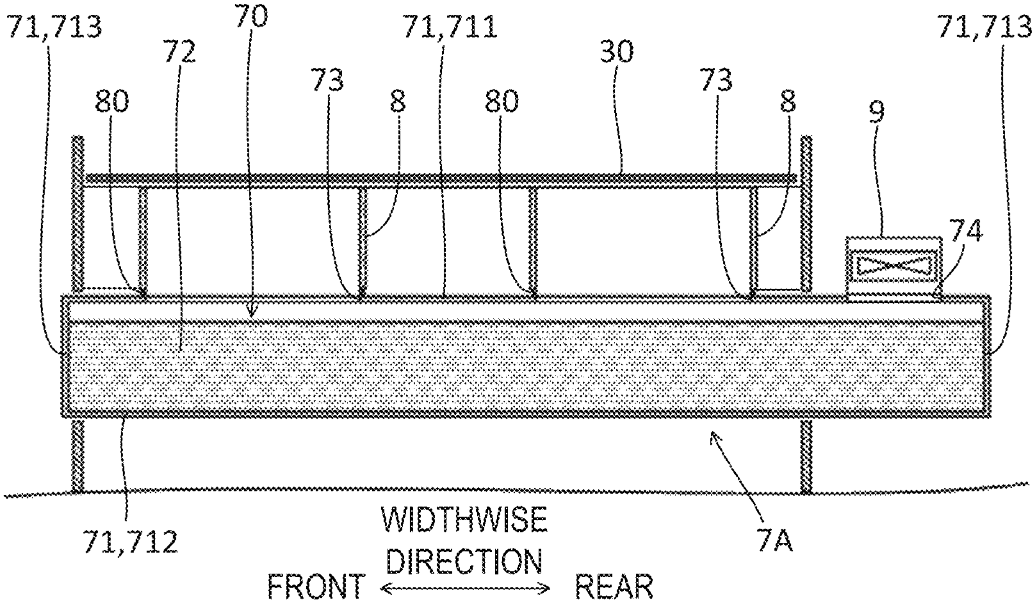
FIG. 8 is a schematic view of a storage part in the inkjet recording device according to the embodiment of the invention.

Interspace between the duct 8 and the connection opening 73 is sealed by a seal member 80 (see FIG. 8). Type of the seal member 80 is not particularly limited. The seal member 80 may be provided either at a lower-side (near-casing member 71 side) opening of the duct 8 or at the connection opening 73. When the casing member 71 is fitted to the fitting region 7A, the seal member 80 is crushed, causing a seal to be applied between the duct 8 and the connection opening 73. As a result of this, leakage of flushing ink from between the duct 8 and the connection opening 73 can be suppressed. Also, later-described suction by a suction mechanism 9 can be fulfilled efficiently.

The printer 100 includes a suction mechanism 9. In a storage process for flushing ink, the suction mechanism 9 is put into use. The suction mechanism 9 sucks up flushing ink. By the suction mechanism 9 sucking up flushing ink, the flushing ink intrudes into the storage region of the casing member 71. As the suction mechanism 9, a fan, a compressor or the like is usable.

The suction mechanism 9 is placed rearward in the widthwise direction. The suction mechanisms 9 are assigned to the individual storage parts 7 in one-to-one correspondence. Each suction mechanism 9 is connected to the casing member 71 of one storage part 7 corresponding thereto. In addition, the individual suction mechanisms 9 are identical in connection structure to one another. Accordingly, hereinafter, the connection structure of one duct 8 will be concentratedly treated and explained, while that of the other ducts 8 will be omitted in description.

The casing member 71 has a suction opening 74 at the top face portion 711. The suction opening 74 is an opening vertically (in the plate-thicknesswise direction) extending through the top face portion 711. Then, the suction mechanism 9 is placed so as to block the suction opening 74. The suction mechanism 9 sucks up air through the suction opening 74.

In this connection, the water-absorbing member 72 is laid on a bottom face of the casing member 71. A vertical width of the water-absorbing member 72 is smaller than a vertical width of the storage region (placement region for the water-absorbing member 72) of the casing member 71. Therefore, inside the casing member 71, a clearance 70 is provided between the water-absorbing member 72 and the top face portion 711. The clearance 70 is communicated with the suction opening 74 through the connection opening 73. As a result of this, the clearance 70 serves as a flow passage of air sucked by the suction mechanism 9.

With this configuration, the suction mechanism 9 sucks up flushing ink via the clearance 70. As a result, efficient suction of flushing ink can be fulfilled. In addition, flushing ink, by being sucked by the suction mechanism 9, intrudes inward of the casing member 71 so as to reach the water-absorbing member 72. The water-absorbing member 72 absorbs flushing ink. Accordingly, even though flushing ink is sucked up, scattering of flushing ink from the suction opening 74 can be suppressed.

<Discard Timing of Flushing Ink>

When the storage part 7 (casing member 71) has been filled of stored flushing ink to capacity, there arises a need for executing discarding work for flushing ink. The discarding work of flushing ink may be executed after the storage part 7 has been filled up with stored flushing ink. However, it is difficult for the user to decide whether or not the flushing ink has become full to capacity.

Accordingly, the controller 6 determines a flushing ink storage level stored in the storage part 7. For example, an ink quantity ejected from the nozzles 4N by one-time flushing process can be determined beforehand. In other words, the ink quantity ejected from each recording head 40 by one-time flushing process can be predetermined. Thus, based on a number of executions of the flushing process, the flushing ink storage level can be determined.

The controller 6 counts a number of executions of flushing process. Then, based on the number of executions of flushing process (count value), the controller 6 determines a flushing ink storage level stored in the storage part 7. In other words, based on the number of executions of flushing process, the controller 6 decides whether or not the flushing ink stored in the storage part 7 has become full to capacity.

For example, the operation part 602 accepts from the user that flushing ink has been discarded. When the operation part 602 has accepted that flushing ink has been discarded, the controller 6 resets the number of executions of flushing process (count value). From this time on, each time the flushing process is executed one time, the controller 6 increments the number of executions of flushing process by one count. Then, when the number of executions of flushing process (count value) has reached a predetermined threshold value, the controller 6 decides that flushing ink storage level stored in the storage part 7 has reached a predetermined threshold value. In other words, when the flushing ink storage level stored in the storage part 7 has reached the threshold quantity (when the number of executions of flushing process has reached a threshold number), the controller 6 decides that flushing ink stored in the storage part 7 has become full to capacity.

In addition, as a modification example, a storage level sensor for detecting a flushing ink storage level stored in the storage part 7 may be provided. The type of the storage level sensor is not particularly limited. For example, a sensor for detecting weight of the water-absorbing member 72 may be used as a storage level sensor.

When the flushing ink storage level has reached a threshold quantity, the controller 6 executes notification process for urging discard of flushing ink. For example, the controller 6 instructs the operation part 602 (touch panel) to display a message for urging discard of flushing ink. With this configuration, from the user's point of view, it becomes possible to decide whether or not flushing ink has become full to capacity, hence high convenience.

The embodiment disclosed herein should be construed as not being limitative but being an exemplification at all points. The scope of the invention is defined not by the above description of the embodiment but by the appended claims, including all changes and modifications equivalent in sense and range to the claims.

The invention claimed is:

1. An inkjet recording device comprising:

a recording head which has nozzles for ejecting ink and which ejects ink to a recording medium under conveyance to record an image on the recording medium;

a controller which controls a flushing process of ejecting ink through the nozzles at a timing different from a recording timing of the image onto the recording medium; and a storage part for storing flushing ink ejected through the nozzles during execution of the flushing process, wherein the storage part is removably fitted to a fitting region opposed to the recording head with a conveyance path of the recording medium interposed therebetween, the storage part includes a casing member for storing the flushing ink; and a water-absorbing member placed inside the casing member to absorb the flushing ink;

the casing member has a connection opening, the inkjet recording device further comprises a duct which extends from the recording head side toward the storage part side, and which is connected to the connection opening, and a seal member for sealing between the duct and the connection opening.

2. The inkjet recording device according to claim 1, further comprising:

an endless conveyor belt which has a plurality of openings and which conveys the recording medium while carrying the recording medium on its outer circumferential surface, wherein the fitting region is positioned inside the conveyor belt, the flushing ink, passing through the openings, is stored in the storage part.

3. The inkjet recording device according to claim 1, wherein a passage of the duct extends linearly with a constant width from the recording head side toward the storage part side.

4. The inkjet recording device according to claim 1, wherein the casing member has a suction opening, the inkjet recording device further comprises a suction mechanism connected to the suction opening to suck up air through the suction opening, wherein inside the casing member, a clearance is provided between the casing member and the water-absorbing member, and the clearance is communicated with the connection opening to the suction opening.

5. The inkjet recording device according to claim 1, wherein a plurality of the storage part are provided, and the plurality of storage parts are fitted to the fitting region in a separate fitting fashion.

6. The inkjet recording device according to claim 5, wherein a plurality of the recording heads for ejecting ink of mutually different colors are provided, and the plurality of recording heads are placed so as to be opposed to the mutually different storage parts with the conveyance path interposed therebetween.

7. The inkjet recording device according to claim 1, wherein the controller determines a storage level of the flushing ink stored in the storage part, and when the storage level has come to a predetermined threshold quantity, the controller executes a notification process of urging discard of the flushing ink.

* * * * *